United States Patent [19]

Kobayashi et al.

[11] 3,824,566

[45] July 16, 1974

[54] MAGNETIC THIN FILM PLATED WIRE MEMORY

[75] Inventors: Seihin Kobayashi; Michihiro Torii, both of Shizuoka, Japan

[73] Assignee: Fuji Denki Kagaku Kabushiki Kaisha, Tokyo, Japan

[22] Filed: Oct. 3, 1972

[21] Appl. No.: 294,595

[30] Foreign Application Priority Data

Oct. 9, 1971 Japan ............................ 46-79555

[52] U.S. Cl.340/174 PW, 340/174 LA, 340/174 TB, 340/174 RC, 340/174 NC, 340/174 DA

[51] Int. Cl. ........................ G11c 11/14, G11c 7/02

[58] Field of Search 340/174 PW, 174 LA, 174 TB, 340/174 RC, 174 NC, 174 DA

[56] References Cited

UNITED STATES PATENTS

| | | | |
|---|---|---|---|
| 3,027,546 | 3/1962 | Howes et al. | 340/174 LA |
| 3,144,641 | 8/1964 | Raffel | 340/174 DA |
| 3,245,060 | 4/1966 | Wells et al. | 340/174 LA |
| 3,466,626 | 9/1969 | Ulzurrun | 340/174 LA |
| 3,466,630 | 9/1969 | Mayne | 340/174 RC |
| 3,540,015 | 11/1970 | Nissen | 340/174 LA |
| 3,568,170 | 5/1968 | Catalani, Jr. | 340/174 LA |
| 3,697,967 | 10/1972 | Homma | 340/174 LA |

*Primary Examiner*—Stanley M. Urynowicz, Jr.
*Attorney, Agent, or Firm*—Wenderoth, Lind & Ponack

[57] ABSTRACT

In a magnetic thin film plated wire memory has a plurality of digit pair wires intersecting substantially at right angles with word wires, and the digit wire pairs are grouped into a plurality of sense sections each of which include an equal number of digit pairs wire. Each sense section has one common sensing device and one digit driver. The digit wire pairs arranged on lines in each sense section are parallelly connected with the other digit wire pairs on the same lines in the other sense sections, the digit wire pairs on same lines in the different sense sections being also parallelly connected to one line selection switch.

6 Claims, 3 Drawing Figures

PATENTED JUL 16 1974 3,824,566

SHEET 1 OF 3

MAGNETIC THIN FILM PLATED WIRE MEMORY

This invention relates to a non-destructive read out magnetic thin film plated wire memory having a plurality of digit wires and a plurality of word wires intersecting at right angles with each other. More particularly, this invention relates to digit information selection circuits for the non-destructive read-out magnetic thin film plated wire memory.

In a conventional magnetic thin film plated wire memory of the type with which the present invention is concerned, a plurality of digit wire pairs and a plurality of word wires are disposed to intersect at right angles with each other. Each pair of the digit wires comprises a magnetic wire having a magnetic thin film plated on a conductive wire, and a non-magnetic dummy-digit wire. Each digit wire pairs are connected at one end thereof to sense pre-amplifier and is grounded at the other end thereof. Two resistors in series are connected to each digit wire pairs in parallel to the pre-amplifier and adjacent thereto. A digit driver is connected between the two resistors in each digit wire pairs. Thus, a write-in operation for each digit wire pairs is effected by each associated digit driver.

However, according to the conventional prior art magnetic thin film plated wire memory as described above, since independent digit drivers are each disposed for each digit wire pairs, the number of the digit drivers cannot help but become large and the expense therefor is great, particularly for a large capacity memory apparatus.

Accordingly, an object of the present invention is to provide a non-destructive read out magnetic thin film plated wire memory with fewer digit drivers to attain a low cost and high density memory apparatus.

According to the present invention, a magnetic thin film plated wire memory is provided which comprises a plurality of digit wire pairs, each pair having at least a magnetic plated wire, a plurality of word wires intersecting substantially at right angles with the digit wire pairs, a plurality of first sense means connected to each digit wire pairs, and a plurality of digit means for supplying pulses to the digit wire pairs. The digit pair wires are divided into a plurality of sense sections each of which includes equal number of digit wire pairs. Second sense means are each connected to a plurality of the first sense means in each sense section. The digit means are each connected to a plurality of the digit wire pairs in each sense section. The digit wire pairs arranged on lines in each sense section are parallelly connected with the other digit wire pairs on the same lines in the other sense section. The digit wire pairs on the same lines in different sense sections are also parallelly connected to one line selection switch.

Figure 1:
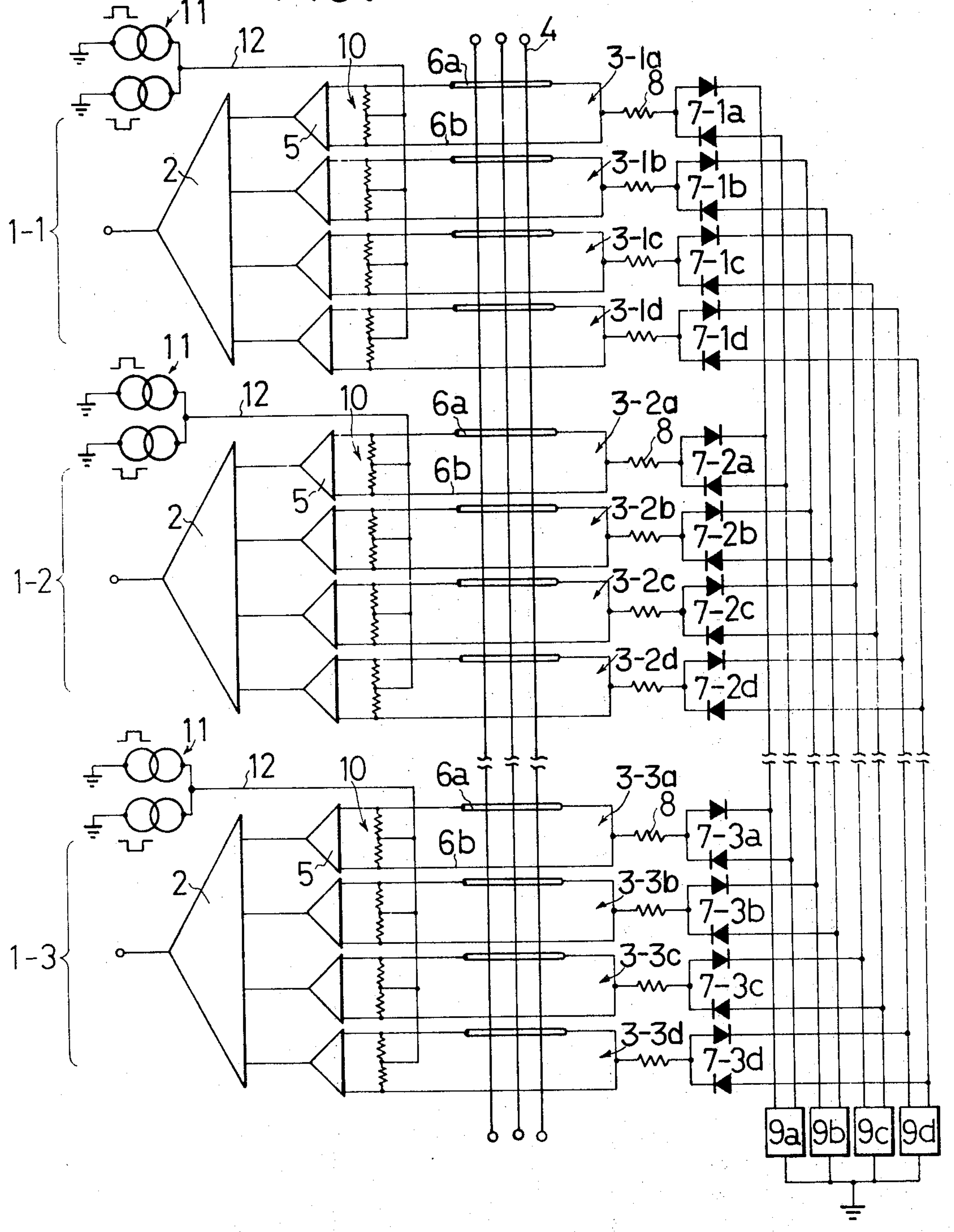
Figure 2:
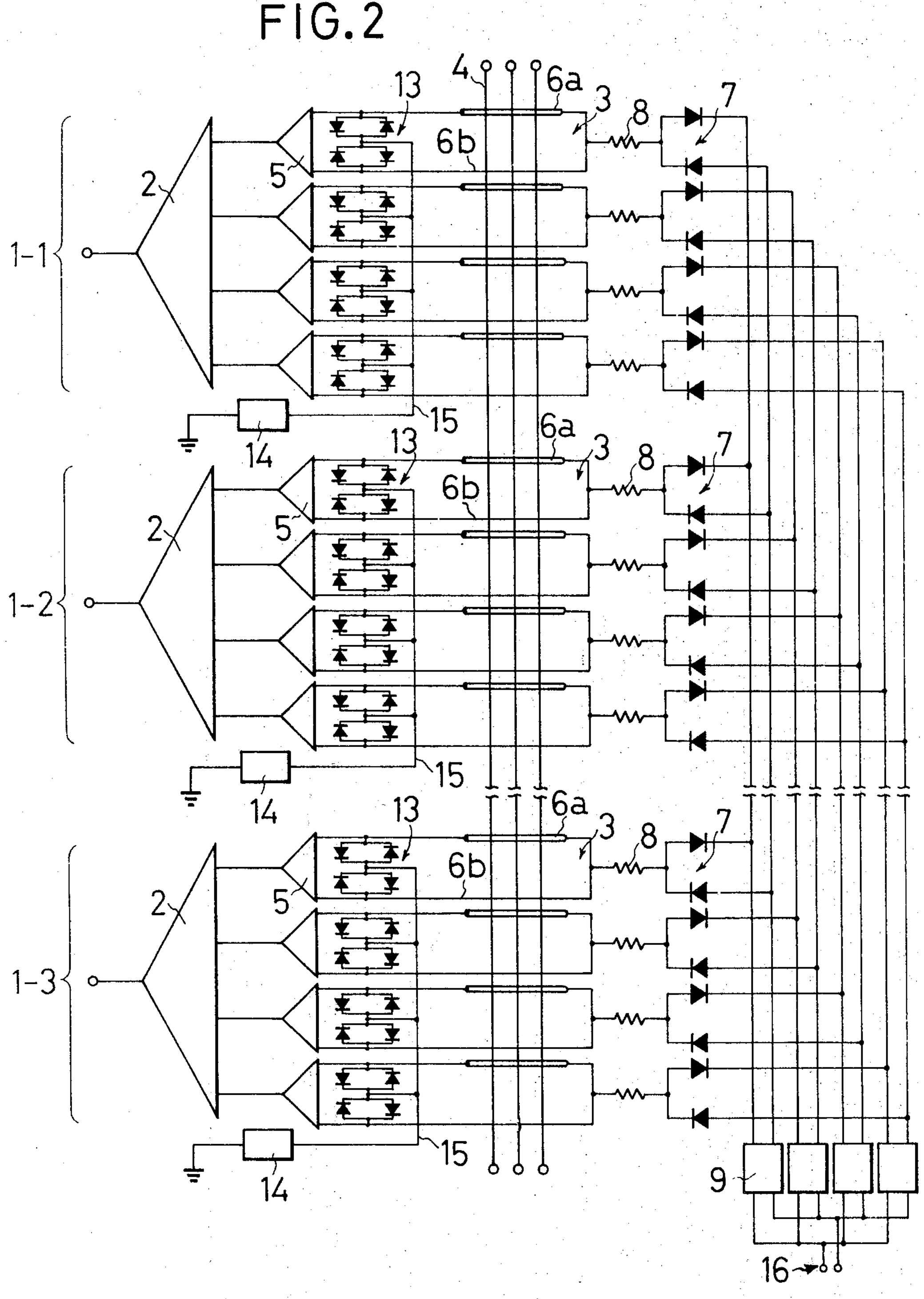
Figure 3:
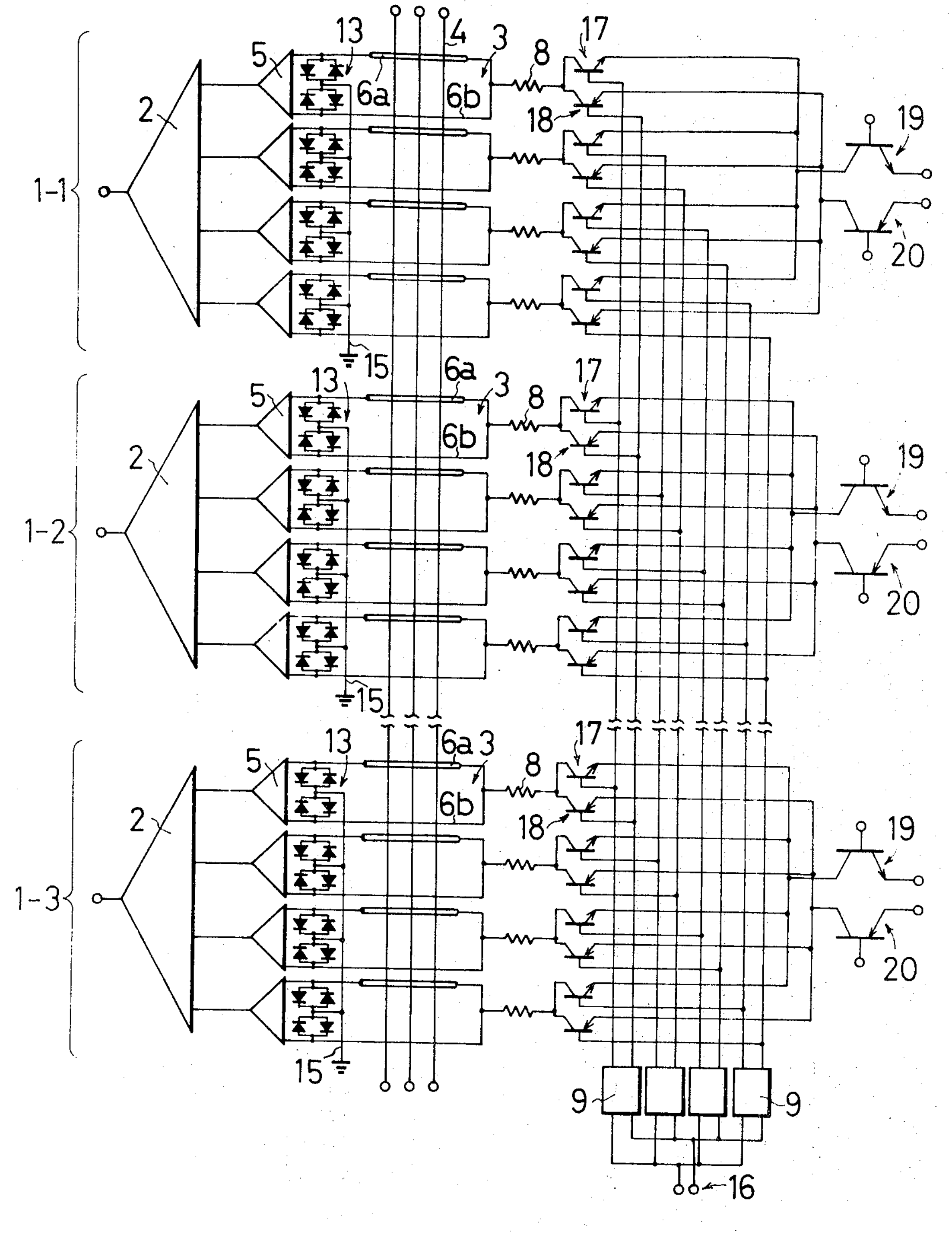

The aforementioned and other objects and features of the present invention will be apparent from the following detailed description of a specific embodiments thereof, when read in conjunction with the accompanying drawings in which:

FIGS. 1 through 3 are digit information selection circuits respectively adapted for magnetic thin film plated wire memories according to embodiments of the present invention.

Referring now to FIG. 1 showing a first embodiment of the present invention, three sense sections 1 — 1, 1 — 2, 1 — 3 each having a sense amplifier 2 are provided. Each sense section has four pairs of digit wires 3 intersecting at right angles with word wires 4. Concerning the first sense section 1 — 1, the sense amplifier 2 is connected with four sense pre-amplifier 5 each of of which is connected with one end of one pair of digit wires 3 comprising magnetic thin film plated wire 6a and non-magnetic conductive wire **6*b*. Each pair of digit, wires is connected to a bipolar diode switch indicated by reference number 7 plus a suffix through a resistor 8 at one end opposite to the pre-amplifier 5. The bipolar diode switch 7 — 1*a* on the first line in the first sense section 1 — 1 is connected in parallel with switches 7 — 2*a*, 7 — 3*a* in the first lines in the other sense sections 1 — 2, 1 — 3 and is connected to a line selection switch 9*a*. Likewise, the other bipolar diode switches are connected to associated line selection switches. The line selection switches are grounded. In other words, a first digit wire pair 3—1*a* of the first sense section 1—1, a first digit wire pair 3—2*a* of the second sense section 1—2, and a first digit wire pair 3—3*a* of the third sense section 1—3 are commonly connected to the line selection switch 9*a*. Likewise, second digit wire pairs 3—1*b*, 3—2*b*, 3—3*b* are connected in common to another line selection switch 9*b*.**

Each pair of digit wires 3 have a terminal resistor 10 at one end portion adjacent the pre-amplifier 5 in parallel thereto. The terminal resistors 10 in one sense section 1 are connected to a digit driver 11 through conductive wires 12 connected to centers of each resistor 10, so that positive and negative pulses may be applied to the digit wires 3 in the same sense section.

The digit information selection circuit according to the first embodiment is so constructed that the number of the line selection switches **9*a* — 9*d* is equal to the number of lines of the digit wire pairs 3 in one sense section or equal to the number of the pre-amplifiers 5 in one sense section. The number of the digit drivers 11 is equal to the number of the sense sections 1 — 1, 1 — 2, 1 — 3. Namely, in the first embodiment of the present invention shown in FIG. 1, three digit drivers 11 and four line selection switches 9** are good enough to operate the memory apparatus.

In a second embodiment shown in FIG. 2, in place of the terminal resistors 10 in the first embodiment, current voltage dividers 13 each consisting of bipolar diodes are provided. The current-voltage dividers 13 in each sense section are connected with a digit selection switch 14 through conductive wire 15 connected to the to centers of each of the current-voltage dividers 13 and grounded.

Line selection switches 9 which are connected with bipolar diode switches 7 in the same way as the first embodiment are further connected with positive-negative electric power source 16.

Other remaining parts in the second embodiment are substantially the same as the first embodiment.

In a third embodiment shown in FIG. 3, PNP and NPN transistors 17, and 18 are provided in place of the bipolar diode switches 7 in the second embodiment. The bases of the PNP transistors 17 arranged on lines in each sense section 1 are parallelly connected with the other bases of the PNP transistors 17 on same lines in the other sense sections. The bases of the NPN transistors 18 arranged on lines in each sense section 1 are parallelly connected with the other bases of the NPN transistors 18 on same lines in the other sense sections. The bases of the PNP and NPN transistors 17 and 18 on same lines in the different sense sections are also parallelly connected to one line selection switch 9. The line selection switches are connected to a positive-negative electric power source 16. The collectors of each pair of transistors 17 and 18 are connected with digit wire pairs 3 through resistors 8. The emitters of the PNP transistors 17 in one sense section 1 are connected with each other and to a negative electric power source 19, while those of the NPN transistors 18 in the sense section 1 are connected with each other and to a positive electric power source 20.

Current-voltage dividers 13 each consisting of bipolar diodes in each sense section are grounded through a conductive wire 15 which connects to the center of the each current-voltage divider 13.

The other remaining parts are substantially same as the second embodiment.

In the digit information selection circuit in the third embodiment, the electrostatic capacity between the base and the emitter of the transistors 17 and 18 is far smaller than the capacity of the diodes 7 in the circuit of the second embodiment. In addition, leakage of electric current through stray capacity and the like is reduced with the result that switching properties such as rising time, storing time and the like are excellent, thereby increasing reliability of the memory apparatus.

According to the magnetic thin film plated wire memory of the present invention wherein write-in information is selected by operating the line selection switch 9 with the digit selection switch 11, 14 or 19 and 20, the number of these switches is reduced to provide an economical and high density memory apparatus, compared with the conventional memory apparatus of the type above. That is, in a memory apparatus for M × P words − N bits length wherein M is the number of word wires, P is the number of digit wire pair, and N is the number of sense sections, the number of the line selection switches and digit selection switches can be reduced to P and N respectively, whereas P + N switches are needed according to the conventional prior art magnetic thin film plated wire memory.

Though the present invention has been described with reference to preferred embodiments of the present invention, modifications may be made. For example, the digit wire pairs 3 consisting of a magnetic thin film plated wire 6a and a non-magnetic conductive wire 6b may be two magnetic thin film plated wires.

What is claimed is:

1. A magnetic thin film plated wire memory comprising a plurality of digit wire pairs each of which has at least one magnetic thin film plated wire, a plurality of word wires intersecting substantially at right angles with said digit wire pairs, a plurality of first sense amplifier means each of which is connected to one of said digit wire pairs, a plurality of digit driving means for supplying pulses to said digit wire pairs, a plurality of second sense amplifier means which are connected to the corresponding first sense amplifier means, and a plurality of line-selection switches, said digit pair wires being grouped into a plurality of sense sections each of which includes an equal number of digit wire pairs, there being one of said second sense amplifier means for each of said sense sections to which the wire pairs of the sense section are connected through said first sense amplifier means, there being one digit driving means for each sense section which is connected to said digit wire pairs of the sense section, and each of said digit wire pairs in the same sense section being connected to the corresponding digit wire pairs of the other sense sections and to one of said line-selection switches.

2. A magnetic thin film plated wire memory as claimed in claim 1, wherein said digit driving means comprises a plurality of resistors each being connected to said digit wire pairs in parallel to said first sense amplifier means adjacent thereto and a plurality of digit drivers for supplying positive and negative pulses to said digit wire pairs, each of said digit drivers being connected to the centers of said resistors in one of said sense sections; and each of said line selection switches is connected at one end thereof to said digit wire pairs through bipolar switches constituted by diodes and a resistor and is grounded at the other end thereof.

3. A magnetic thin film plated wire memory as claimed in claim 1, wherein said digit means comprises a plurality of current-voltage dividers each having first bipolar switches constituted by diodes and being connected to said digit wire pairs in parallel to said first sense amplifier means adjacent thereto and a plurality of bit selection switches each being grounded at one end thereof and connected at the other end thereof to centers of said first bipolar switches in one sense section; and each of said line selection switches is connected at one end thereof to said digit wire pairs through second bipolar switches constituted by diodes and a resistor and connected at the other end thereof to a positive-negative power source.

4. A magnetic thin film plated wire memory as claimed in claim 1, wherein said digit wire pairs on each line are connected to collectors of PNP and NPN transistors through a resistor; the bases of the PNP transistors for the respective lines in each sense section being parallelly connected with the bases of the PNP transistors for corresponding lines in the other sense sections; the bases of the NPN transistors for the respective lines in each sense section being parallelly connected with the base of the NPN transistors for corresponding lines in the other sense sections; the bases of the PNP and NPN transistors for corresponding lines in the different sense sections also being parallelly connected to one line selection switch; the emitters of the PNP transistors in each sense section being connected together and to a negative electric power source; and the emitters of the NPN transistors in each sense section being connected together and to a positive electric power source.

5. A magnetic thin film plated wire memory as claimed in claim 1, wherein each of said digit wire pairs comprises magnetic thin film plated wire having a magnetic thin film plated upon a conductive wire and a non-magnetic conductive wire for dummy-digit wire.

6. A magnetic thin film plated wire memory as claimed in claim 1, wherein each of said digit wire pairs comprises two magnetic thin film plated wires.

* * * * *